Dec. 23, 1969 G. MELCHIOR 3,485,942

MEANS FOR RAISING THE SIGNAL-TO-NOISE RATIO OF A FREQUENCY MODULATED SUBCARRIER IN A COMPOSITE COLOR TV SIGNAL

Filed March 4, 1966 2 Sheets-Sheet 1

INVENTOR:
GÉRARD MELCHIOR
BY Kurt Kelman
AGENT

INVENTOR:
GÉRARD MELCHIOR
BY Kurt Kelman
AGENT

United States Patent Office 3,485,942
Patented Dec. 23, 1969

3,485,942

MEANS FOR RAISING THE SIGNAL-TO-NOISE RATIO OF A FREQUENCY MODULATED SUB-CARRIER IN A COMPOSITE COLOR TV SIGNAL

Gérard Melchior, Levallois, France, assignor to Compagnie Francaise de Television, a corporation of France Filed Mar. 4, 1966, Ser. No. 531,800
Int. Cl. H04n 1/46, 9/12
U.S. Cl. 178—5.2 2 Claims

ABSTRACT OF THE DISCLOSURE

For reducing the noise in a frequency modulated color subcarrier, the frequency band of video signals, received at a retransmitting station, is split into its lower and upper portions. The upper band portion, which contains the color subcarrier, is clipped to a predetermined level, amplified and recombined with the unchanged lower band portion to form the improved video signals that are retransmitted from the station.

The present invention relates to an improvement to apparatuses for retransmitting colour television composite video signals.

It is suitable for the secam system or sequential-simultaneous system with memory, in which the composite video signal comprises a luminance signal and a colour subcarrier, when the latter is frequency-modulated by a colour information. This subcarrier is superimposed onto the luminance signal in a frequency band, which will be referred to as the "common band," located in the upper region of the frequency band of the luminance signal; preferably, the modulated subcarrier is subjected, before being added to the luminance signal, to filtering in a filter whose relative gain characteristic rises on either side of a predetermined frequency, for example the resting frequency, of the frequency swing interval, i.e., the variation range of the instantaneous frequency of the subcarrier.

In order to simplify the terminology, a filter whose relative gain characteristic rises on either side of a predetermined frequency of the frequency swing interval will be referred to as a "coder filter"; a filter whose relative gain characteristic decreases on either side of a predetermined frequency of the frequency swing interval, will be called a "decoder filter." A "coder filter" and a "decoder filter," such that a signal passing through these two filters connected in series, does not undergo any amplitude or phase distortion, will be called "associated filters." The receivers co-operating with a transmitter using a coder filter use an associated decoder filter, these two filters being used for improving the signal to noise ratio.

The improvement according to the invention makes it possible to avoid the degradation of the picture quality occuring, in consequence of noise, in certain transmissions, especially across a long chain of relays.

In black and white or achromatic television, it is known to use the following arrangement:

The bandwidth of the video signal is reduced through low-pass filtering; in consequence, the noise is also reduced and, at the terminal transmission station, which finally transmits the signal for the public at large, the definition lost in the process is compensated to some degree—apparently, at least—by a process called "crispening"; this method consists in adding to the signal with reduced bandwidth an auxiliary signal which comprises higher frequencies and which is obtained by various operations (differentiations, rectifications and additions) from the signal with reduced bandwidth.

However, this method does not solve the problem of the subcarrier in the case of colour television. In particular, it happens quite frequently, during transmission by radio links, that the spectrum distribution of the noise is not uniform, but rather triangular, and in this case, the deterioration caused by noise in the channel of the subcarrier appears before that caused by noise in the luminance channel, so that, at least in some cases, it is not only necessary, but also sufficient, to improve the protection of the subcarrier.

It is an object of the invention to provide a retransmitting station, comprising a circuit, which will be referred to as a "noise reducing circuit," to which the composite video-signal received by said station is applied, before being retransmitted, in order to improve the signal-to-noise ratio in the subcarrier channel, this step being associated or not with an alteration of the subcarrier level.

By "subcarrier level" is meant the mean amplitude of the subcarrier relatively to a reference level (for example, synchronizing pulses) of the composite video signal.

According to the invention, there is provided a retransmitting station for retransmitting a composite video signal, comprising a luminance signal and a subcarrier which is frequency-modulated by a colour information, said retransmitting station comprising a circuit, referred to as a noise reducing circuit, said circuit comprising an input for applying thereto the composite video signal received by said station, said input being coupled to the first and to the second input of an adder through a first and a second channel; said first channel being arranged to transmit to said first input of said adder at least the lower frequency components of said composite video signal, said second channel comprising a band-pass filter for transmitting said subcarrier, and a limiter coupled to the output of said band-pass filter; the output of said adder being the output of said noise reducing circuit.

The second channel may also comprise linear amplifying means which may be inserted at any point of the second channel.

The term "linear amplifying means" should be understood in a broad sense including attenuating means.

The invention has also for its object retransmitting chains using one or more stations including a noise reducing circuit.

The invention will be further explained and other characteristics thereof will appear by means of the following description with reference to the accompanying drawings, in which.

The invention will be described under the following assumptions: a retransmitting chain comprises a "first station" comprising a "first transformation circuit" for the composite video signal, this first transformation circuit being of the noise reducing type, and further enhancing the level of the subcarrier, and a second station, provided with a "second transformation circuit," which may be or not of the noise reducing type; those two stations may be linked through intermediate stations acting as single repeaters.

It will further be assumed that the subcarrier of the composite video signal is submitted to filtering in a "coder filter" of the above-mentioned type, before being added to the luminance signal.

The composite video signal received by the first station will be designated by S, it being assumed that this signal, referred to as the "original signal," was formed in a transmitting station, referred to as the "station of origin." The composite video signal retransmitted by the first station and received by the second one will be called "intermediate signal S′," while the signal retransmitted by the second station will be called "final signal S″."

Figure 1:
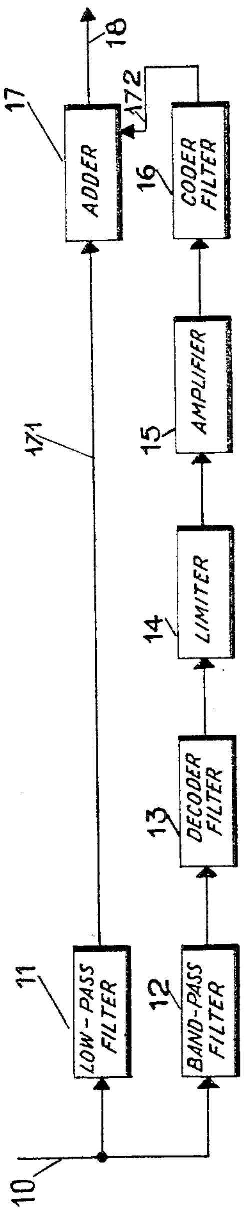
FIG. 1 is the block diagram of an embodiment of a noise reducing circuit.

In FIG. 1, the input 10 receives the original composite video singal S, obtained in the first station, for example through demodulating a carrier wave, or else received by means of a cable.

Input 10 feeds a first channel, formed by a low pass filter 11, limiting the signal S to a frequency band B, with an upper limit such that it should contain practically only luminance components, but which may be lower than strictly necessary for this condition to be fulfilled.

The input 10 also feeds a bandpass filter 12 whose bandwidth is the same, or of the same order of magnitude, as that of the filter which extracts the subcarrier in the receivers of users—i.e., people of the public at large—served by the first station. The bandpass filter 12 is connected to the input of a decoder filter 13 with the same relative gain characteristics as the decoder filter used in those receivers before the demodulation of the subcarrier; after the decoder filter, a limiter 14, an amplifier 15 and a coder filter 16 are serially mounted. The outputs of the coder filter 16 and of the low-pass filter 11 are connected to the two inputs 172 and 171 of an adder 17, whose output 18 delivers the intermediate signal S′.

The decoder filter 13 is a filter associated with the coder filter of the station of origin, and in consequence any amplitude modulation of the output signal of the filter 13 is due substantially, on the one hand, to noise, and on the other hand to the components of the luminance signal located in the common band, or to the auxiliary amplitude modulation, to which the subcarrier may be subjected in the station of origin.

This amplitude modulation is suppressed by the limiter 14, whose output signal is suitably amplified by the amplifier 15. Finally, the subcarrier passes through another coder filter 16, prior to being added to the output signal of the low pass filter 11 in the adder 17.

It may be seen that this arrangement makes it possible to reduce noise in the subcarrier channel.

To this end, it is sufficient to select a sufficient low limiting threshold for limiter 14.

On the other hand, the circuit of FIG. 1 makes it possible to raise the level of the subcarrier without a corresponding enhancing of the partial luminance signal located in the common band, which would result in an unduly large peak-to-peak amplitude of the whole composite video signal.

Obviously, certain elements of the circuit of FIG. 1 may be combined, for example, the limiter and the amplifier.

The coder filter 16 may or may not have the same relative gain characteristic as the coder filter of the station of origin.

Figure 3:
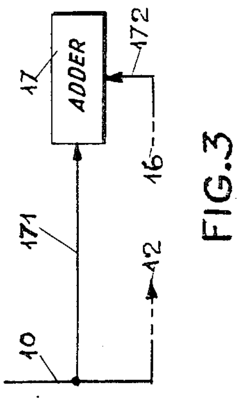
FIG. 3 shows a modification of the diagram of FIG. 1.

FIG. 3 shows a variation of the circuit according to FIG. 1. With this circuit, the whole of the luminance signal including the original signal S is maintained in the intermediate signal S′. Compared with the circuit of FIG. 1, the bandpass filter 11 has not been retained, the input 10 being directly connected to the input 171 of the adder 17, and the increase in the level of the subcarrier is effected by adding, to the subcarrier contained in the original signal, the output signal of the coder filter 16. The gain of the amplifier 15 is selected accordingly, the second channel of the circuit 1, feeding the second input 172 of the adder 17, remains otherwise unchanged. This arrangement requires obviously that the coder filter 16 should have the same relative gain curve as the coder filter in the station of origin.

FIG. 3 shows only the modified portion of the circuit.

Figure 2:
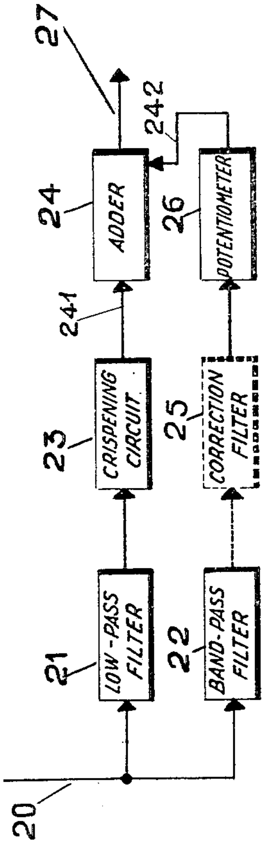
FIG. 2 is the block diagram of an embodiment of a transformation circuit for the composite video signal in a retransmitting station which may be used for co-operating with a retransmitting station provided with a noise reducing circuit, which at the same time raises the level of the subcarrier, said transformation circuit effecting a reduction of the level of the subcarrier.

FIG. 2 shows the transformation circuit of the second station. Here, the input 20 receives the signal S′, generally obtained through demodulating a carrier. Preferably, according to the known art, the higher frequency reception circuits are equipped with an automatic gain control device which eliminates or reduces the effects of the propagation conditions or other instability factors on the value of the composite video signal.

The input 20 is connected in parallel to a low-pass filter 21 and a bandpass filter 22 whose bandwidths are the same, or of the same order of magnitude, as those of the filters 11 and 12 of the first transformation circuit. The low-pass filter 21 is followed by a crispening circuit 23, whose output is connected to a first input 241 of an adder 24.

The output signal of the filter 22 comprises substantially the frequency-modulated subcarrier, as shaped by passage through the coder filter 16 of the circuit of FIG. 1.

It will be noted that the decoders of the receivers served by the second station will generally be the same as the decoders in receivers served by the station of origin, but this is not an essential condition for the operation of the apparatus according to the invention.

If the coder filter 16 is a filter associated with the decoder filters in the television receivers served by the second station, the output of the badnpass filter 22 need be connected to the second input 242 of the adder 24 only through a level adjusting device 26, adapted to restore a subcarrier level suitable for the receivers served by the second station.

The device 26 may be a simple potentiometer with manual adjustment. However, at least in certain radio links, it may be advantageously substituted by an amplifier with automatic gain control, with sufficiently high time constant, adapted to compensate for the comparatively slow variations in the propagating conditions, which affect the subcarrier in a selective manner. The term "gain" means here a factor which may be lower or higher than 1. The output 27 of the adder 24 delivers the final signal S″.

If the coder filter 16 is not the associated filter of the decoder filter in the receivers served by the second station, the bandpass filter 22 is connected with the level adjusting device 26 through a correction filter 25, which is selected so that the effects of the series connection of this filter and the decoder filter in the receivers served by the station compensate the effects of the coder filter from the viewpoint of distortion, which is important as concerns phase distortion.

The correction filter 25 replaces two filters in series, namely the decoder filter associated with the coder filter 16 in FIG. 1 and a coder filter associated with the decoder filters in the receivers served by the second station, and it may obviously be substituted by those two filters in series. It is shown in dotted lines in the drawing.

Of course the circuit of FIG. 2 is not a noise reducing circuit.

Figure 4:
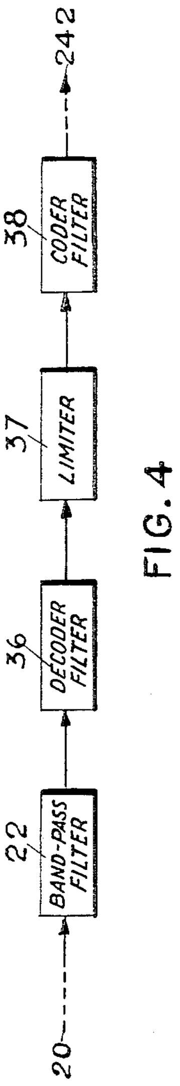
FIG. 4 shows a modification of the diagram of FIG. 2, wherein the transformation circuit is of the noise reducing type.

FIG. 4 shows a variation of the second channel, of FIG. 2. Also here, only the modified portion of the circuit has been shown.

The output of the bandpass filter 22 is coupled to the input of a decoder filter 36, associated with the coder filter 16 of the first transformation circuit (shown in FIG. 1); the decoder filter 36 feeds, through a limiter 37, a coder filter 38, associated with the decoder filter of the receivers served by the second station.

The output of the coder filter 38 is connected to the input 242 of the adder 24 of FIG. 2.

Compared with the diagram in FIG. 2, this embodiment presents two advantages:

(1) The second transformation circuit is also of the noise reducing type;

(2) It eliminates the necessity for a level-adjusting device with automatic gain control where this would otherwise be necessary.

It is obvious that this limiter may be associated with an amplifier, or combined with an amplifier by means of an amplifier-limiter, where this arrangement would appear useful in order to ensure both a limitation threshold which is always reached by the subcarrier, and a sufficient subcarrier level at the input 242.

Figure 5:
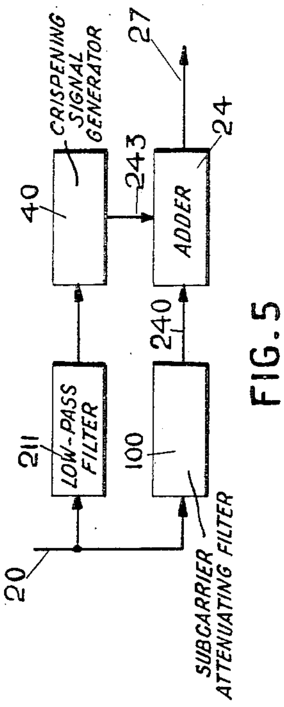
FIG. 5 shows another modification of the diagram of FIG. 2.

FIG. 5 shows a further modification of the second transformation circuit (shown in FIG. 1), which may be used where the coder filter of the first transformation circuit is the filter associated with the decoder filters of the receivers served by the second station.

The correct level of the subcarrier, relative to the brightness signal, is restored by means of a filter 100 whose input is connected to the input 20 of the circuit. The filter 100 has an amplitude-frequency characteristic which, for the bandwidth of the composite video signal, approaches, as far as possible, an "ideal" two-level characteristic, having a lower level for the frequency band occupied by the modulated subcarrier, and an upper level for the lower frequencies. If necessary, the filter 100 is phase-corrected.

In the diagram of FIG. 5, this simple arrangement is associated with crispening means, comprising the elements 211 and 40, connected in series to the input 20. The filter 211 is a low-pass filter of the same type as filter 21 of FIG. 2; it is followed by a circuit 40, comprising those parts of a crispening circuit which derive from the signal with reduced bandwidth, supplied here by filter 211, the auxiliary signal which is thereafter added to the signal with reduced bandwidth. The adder 24 has only two inputs, an input 243 receiving the auxiliary signal formed in the circuit 40 and an input 240 connected to the output of the filter 100.

It should be noted that, if it is not desired to improve the definition of the composite video signal by the crispening method, both the elements 211 and 40 as well as the adder 24 have no longer any use, and the second transformation circuit amounts to filter 100.

The circuit of FIG. 5, of course, is not a noise reducer.

It must be understood that the invention is not limited to the embodiments hereinbefore described and illustrated. For example on the assumption that the filter 16 of the first transformation circuit (FIG. 1) is the associated filter for the decoder filter of the receivers served by the second station then it is possible, instead of restoring the desired balance in the complex video signal through reducing the amplitude of the subcarrier, to restore it by enhancing the components having frequencies lower than those of the common band. If crispening is effected by means of a series channel 211–40 (FIG. 5), the low-pass filter 211 may be advantageously used to this end. In other words, in the circuit of FIG. 5 the filter 100 would be suppressed and the input 240 of the adder 24 would receive the whole intermediate composite video signal, while, by means of a third input, coupled to the output of the low-pass filter 211, the adder would receive again the lower frequency components of the luminance signal.

It should be noted that the diagram of the various circuits do not show the delay device, whereby, according to known art, the propagation times of the different components of the formed composite video signal are equalized.

In this example, a relay chain has been considered, comprising a first station, provided with a noise reducing circuit, which at the same time raises the level of the subcarrier relative to the luminance signal, and another station provided with a transformation circuit, which lowers the relative level of the subcarrier, this second transformation circuit being a noise reducing circuit (circuit of FIG. 4) or not (circuits of FIGS. 2 and 5).

In some cases, i.e., where users must receive the signal transmitted by stations of the chain other than the terminal station, such a structure may not be adequate; it is then possible to provide a retransmitting station, or a chain of stations wherein the subcarrier is always retransmitted at its normal level, but this retransmitting station or at least some of the retransmitting stations of the chain being provided with a noise reducing circuit, wherein the constants of the second channel are selected so as to ensure this normal level of the subcarrier.

Each noise reducing circuit may be of the type illustrated in FIG. 1 or in FIG. 3, or of FIG. 3 with the adjunction of a crispening circuit between the low-pass filter 11 and the input 14 of the adder 17. Of course, such a crispening circuit is advantageous only if users are served by the considered station.

It will be noted that in the subcarrier channel of noise reducing circuits, the linear amplifying means may be inserted at any point of this channel. If they precede the limiter, they are useful in that they allow the use of a sufficiently high limitation threshold.

What is claimed is:

1. A noise reducing network for use in a color TV retransmitting station in which video signals extracted from a first R.F. wave, received at the station, are applied to modulate a second R.F. wave, transmitted from the station, said video signals including a luminance component extending over a broad band of frequencies and a chrominance component, formed by a frequency modulated subcarrier, extending over a relatively narrow band of frequencies located within said broad band in the upper portion thereof, said noise reducing network including:

(a) means for separating the upper portion of said broad band;

(b) means for clipping to a predetermined level and amplifying the signals of said upper portion; and (c) means for adding the thus modified upper band portion to the unmodified entire broad band to obtain the signals that are applied to modulate said second R.F. wave, transmitted from the station.

2. A noise reducing network for use in a color TV retransmitting station in which video signals extracted from a first R.F. wave, received at the station, are applied to modulate a second R.F. wave, transmitted from the station, said video signals including a luminance component extending over a broad band of frequencies and a chrominance component extending over a relatively narrow band of frequencies located within said broad band in the upper portion thereof, said chrominance component being formed by a frequency modulated color subcarrier passed through a coder filter before addition to the luminance component, said noise reducing network including:

(a) means for separating the lower and the upper portions of said broad band;

(b) means for filtering through a decoder filter, clipping to a predetermined level, amplifying and filtering through a coder filter the signals of the upper band portion; and (c) means for adding the thus modified upper portion of the broad band to the unmodified lower portion thereof to obtain the signals that are applied to modulate said second R.F. wave, transmitted from the station; and (d) said coder and decoder filters having an amplitude/frequency characteristic that increases and decreases, respectively, on either side of a common frequency located within said narrow band.

References Cited

UNITED STATES PATENTS

| | | | |
|---|---|---|---|
| 2,851,532 | 9/1958 | Crosby | 179—15 |
| 3,092,776 | 6/1963 | Castellini | 325—474 |
| 3,163,717 | 12/1964 | Loughlin | 179—15 |
| 3,290,433 | 12/1966 | De France et al. | 178—5.4 |
| 3,303,274 | 2/1967 | De France | 178—5.4 |
| 3,305,627 | 2/1967 | Krause | 178—5.2 |
| 3,365,541 | 1/1968 | Melchior | 178—5.2 |
| 3,333,055 | 7/1967 | Krause | 178—6 |

OTHER REFERENCES

Fink: Television Engineering Handbook, McGraw-Hill, 1957, chap. 11, pp. 39–40, art. 11.806.

RICHARD MURRAY, Primary Examiner

J. C. MARTIN, Assistant Examiner

U.S. CL. X.R.

325—45, 46

PO-1050
(5/69)

UNITED STATES PATENT OFFICE
CERTIFICATE OF CORRECTION

Patent No. 3,485,942 Dated December 23, 1969

Inventor(s) Gerard Melchior

It is certified that error appears in the above-identified patent and that said Letters Patent are hereby corrected as shown below:

In the heading, between the penultimate line and the last line, insert:

Claims priority, French applications No. 8,442, filed March 9, 1965, and No. 10,326, filed March 23, 1965

SIGNED AND
SEALED
JUN 9 1970

(SEAL)
Attest:

Edward M. Fletcher, Jr.
Attesting Officer

WILLIAM E. SCHUYLER, JR.
Commissioner of Patents